United States Patent
Garcia

(12) 
(10) Patent No.: US 10,583,775 B2
(45) Date of Patent: Mar. 10, 2020

(54) VEHICLE LIGHT ASSEMBLY

(71) Applicant: Ford Global Technologies, LLC, Dearborn, MI (US)

(72) Inventor: Jose Vladimir Garcia Garcia, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/961,946

(22) Filed: Apr. 25, 2018

(65) Prior Publication Data

US 2019/0329701 A1 Oct. 31, 2019

(51) Int. Cl.
*B60Q 1/26* (2006.01)

(52) U.S. Cl.
CPC ......... *B60Q 1/2642* (2013.01); *B60Q 1/2653* (2013.01); *B60Q 1/2692* (2013.01)

(58) Field of Classification Search
CPC ...... B60Q 1/2611; B60Q 1/05; B60Q 1/2692; B60Q 1/0483; B60Q 1/068; B60Q 1/18
USPC .................................................. 362/523–537
See application file for complete search history.

(56) References Cited

U.S. PATENT DOCUMENTS

| | | | | |
|---|---|---|---|---|
| 5,311,411 A | * | 5/1994 | Garolfi | B60Q 1/05 362/248 |
| 5,433,026 A | * | 7/1995 | McDermott | G09F 21/04 248/292.14 |
| 6,067,012 A | * | 5/2000 | Harding | B60Q 1/2611 362/527 |
| 7,572,044 B2 | * | 8/2009 | Nebeker | B60Q 1/2611 362/526 |
| 7,825,790 B2 | | 11/2010 | Tallinger | |
| 2002/0048173 A1 | | 4/2002 | Schmucker | |

FOREIGN PATENT DOCUMENTS

| | | |
|---|---|---|
| DE | 10117374 A1 | 9/2002 |
| DE | 102007027476 A1 | 12/2008 |
| DE | 202010011447 U1 | 12/2010 |
| EP | 864463 A2 | 3/1998 |

\* cited by examiner

*Primary Examiner* — William J Carter
(74) *Attorney, Agent, or Firm* — David Coppiellie; Price Heneveld LLP

(57) ABSTRACT

A vehicle light assembly is provided herein. The light assembly includes a housing operably coupled with a roof structure of a vehicle and movable between a first position and a second position. An arm is pivotably coupled to the roof structure on a first end portion and operably coupled with the housing on a second end portion. A bracket extends from the housing. The bracket is configured to retain a light bar. One or more light sources are disposed within the light bar.

20 Claims, 5 Drawing Sheets

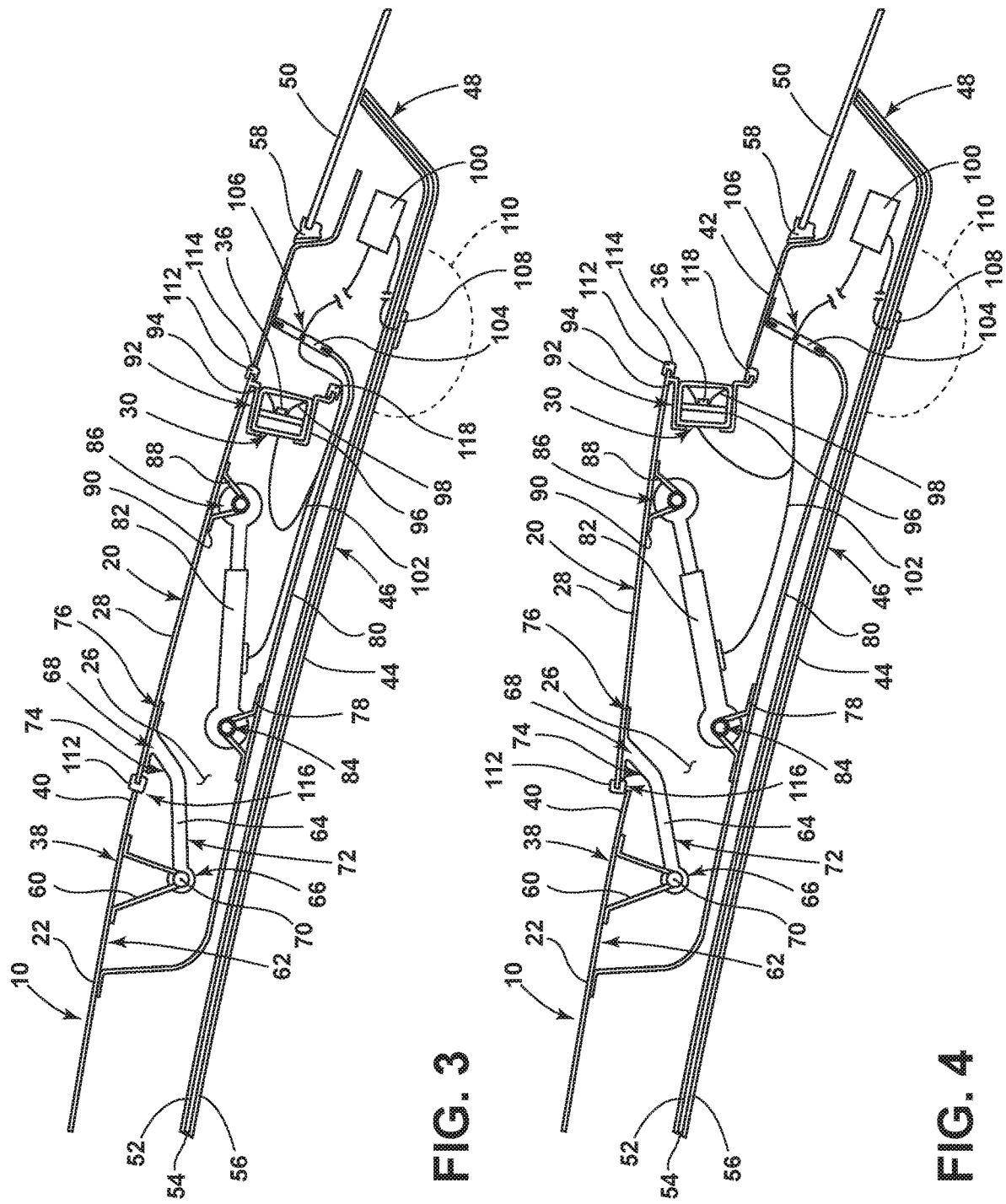

VEHICLE LIGHT ASSEMBLY

FIELD OF THE INVENTION

The present disclosure generally relates to vehicle lighting assemblies, and more particularly, to vehicle lighting assemblies that may be positioned proximate a body structure of the vehicle.

BACKGROUND OF THE INVENTION

Exterior vehicle lighting applications continue to grow in popularity. Accordingly, a light assembly that may be proximate a body structure of the vehicle is provided herein that is operable to provide functional lighting as well as impart a stylistic element to a vehicle.

SUMMARY OF THE INVENTION

According to one aspect of the present disclosure, a vehicle light assembly is provided herein. The vehicle light assembly includes a housing operably coupled with a roof structure of a vehicle and movable between a first position and a second position. An arm is pivotably coupled to the roof structure on a first end portion and operably coupled with the housing on a second end portion. a bracket extends from the housing. The bracket is configured to retain a light bar. one or more light sources are disposed within the light bar.

According to another aspect of the present disclosure, a vehicle light assembly is provided herein. The vehicle light assembly includes a housing concealable within a body structure of a vehicle and movable between a first position and second position. A bracket configured to retain a light bar. One or more light sources disposed within the light bar. A peripheral seal disposed around an upper portion of the housing. A bracket seal disposed on a bottom portion of the bracket.

According to yet another aspect of the present disclosure, a vehicle light assembly is provided herein. The vehicle light assembly includes a housing concealable within a cavity defined by a body structure of a vehicle and movable between a first position and a second position. A bracket extends from the housing and is configured to retain a light bar. One or more light sources are disposed within the light bar. An actuator is coupled to the housing on a first end portion and to an interior surface of the cavity on a second end portion.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a cross-sectional view of the vehicle and light assembly of FIG. 1 taken along the line of FIG. 1;

FIG. 4 is a cross-sectional view of the vehicle and light assembly of FIG. 2 taken along the line IV-IV of FIG. 2;

DETAILED DESCRIPTION OF THE PREFERRED EXAMPLES

Figure 1:
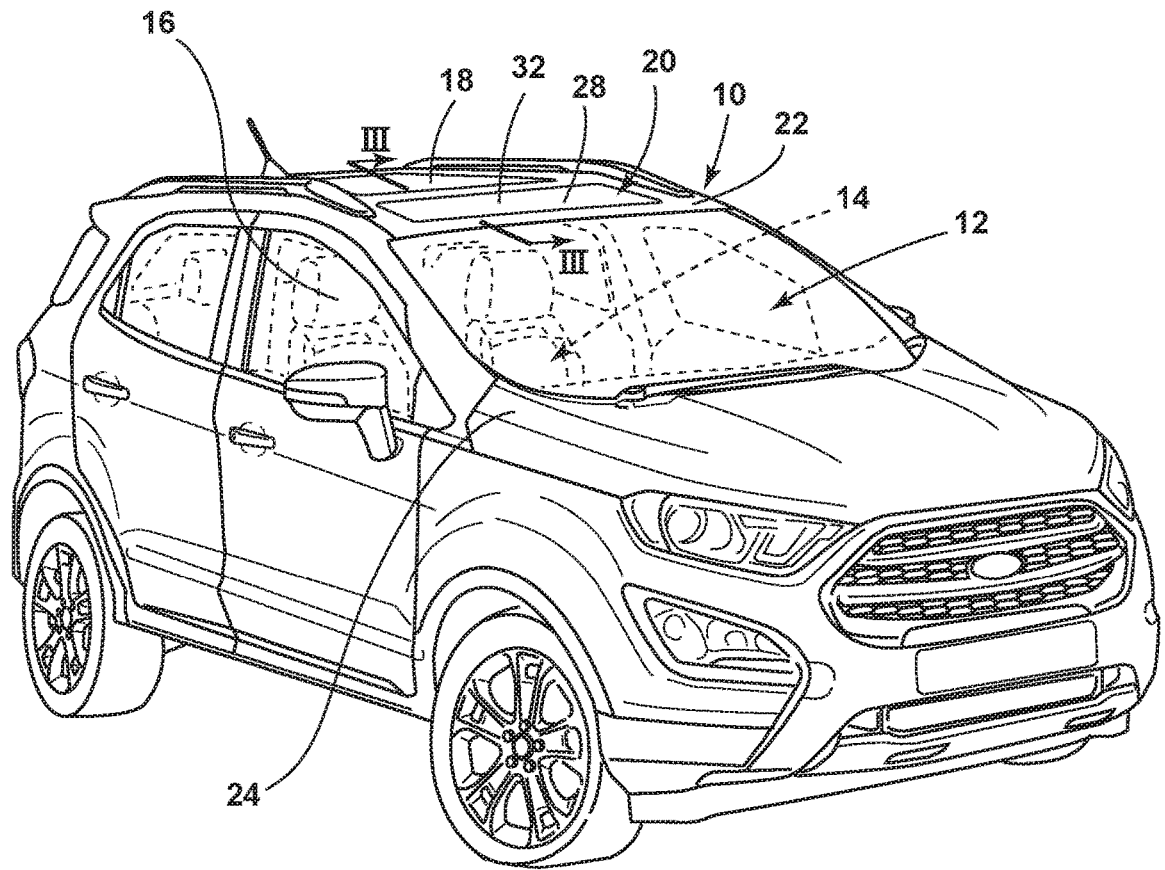
FIG. 1 is a front perspective view of a vehicle and a light assembly in a first position, according to some examples.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a light assembly including a housing that may be disposed within a roof structure of a vehicle and movable between a first position and a second position. An arm may be pivotably coupled to the roof structure on a first end portion and operably coupled with the housing on a second end portion. A bracket may extend from the housing. The bracket may be configured to retain a light bar. One or more light sources may be disposed within the light bar. The light assembly may provide additional functional and/or aesthetic lighting for the vehicle when one or more of the light sources are illuminated.

Figure 2:
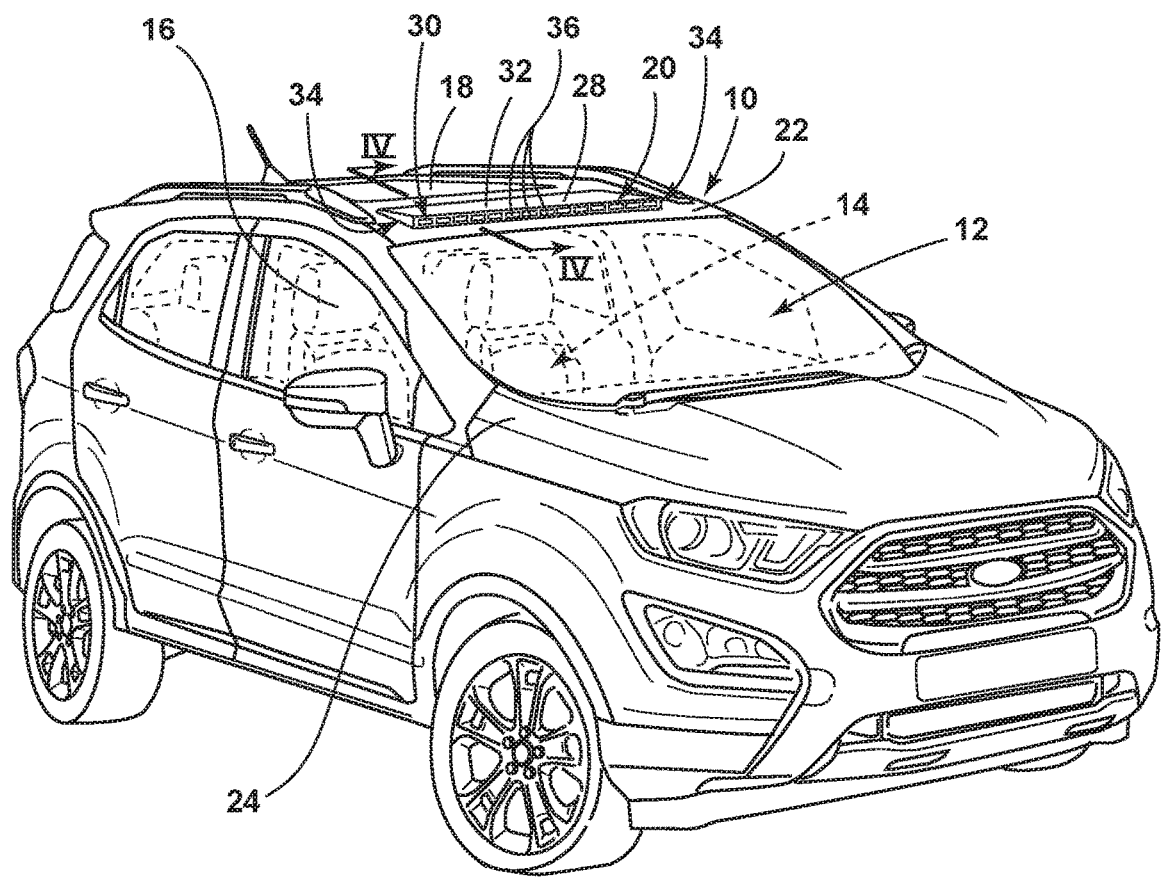
FIG. 2 is a front perspective vehicle of the vehicle and the light assembly in a second position, according to some examples.

Referring now to FIGS. 1 and 2, a vehicle 10 is generally shown configured with an enclosed passenger compartment 12. The passenger compartment 12 may be equipped with passenger seats 14 for allowing one or more passengers to be seated within the passenger compartment 12. The vehicle 10 is further shown equipped with a plurality of movable panels including door-mounted movable windows 16 and a roof-mounted movable sunroof 18. The windows 16 may each be actuated by an actuator, such as an electrically powered motor, to move between a downward open position and an upward closed position. Similarly, the sunroof 18 may be driven by an electrically powered motor or another actuator to move between a closed position and an open position. In the open position, the windows 16 and the sunroof 18 expose the passenger compartment 12 to the outside ambient environment, which allows air and thermal energy transfer to occur between the interior of the passenger compartment 12 and the outside environment.

Referring still to FIGS. 1 and 2, a light assembly 20 may be operably coupled with a roof structure 22, or another body panel 24 of the vehicle 10. The light assembly 20 may be movable between a plurality of positions that may include a first, or stowed, position, as illustrated in FIG. 1, and a second, or deployed position, as illustrated in FIG. 2. It will be appreciated, however, that the light assembly 20 may be disposed in any desired intermediate position between the first position and the second position without departing from the scope of the present disclosure. In some examples, the roof structure 22, or any other body panel 24, defines a cavity 26 (FIG. 3). The light assembly 20, according to some examples, includes a housing 28 that covers at least a portion of the cavity 26 when the housing 28 is disposed in the first position.

A light bar 30 may be operably coupled with the housing 28 and disposed within the cavity 26 in the first position. In the second position, the light bar 30 may be at least partially disposed vertically above the cavity 26, the roof structure 22, and/or the body panel 24. In some examples, the light bar 30 may be integrally formed with any portion of the housing 28. Moreover, the housing 28 includes a top surface 32 and opposing side surfaces 34. The top surface 32 can take on any of a variety of shapes, depending on the features of the housing 28 and/or the roof structure 22 and other design considerations. For example, in some examples, one or more of the surfaces of the housing 28 are planar (e.g., faceted), non-planar, curved or characterized by other shapes. Further, the surfaces can be characterized with portions having planar features and portions having non-planar features.

In some examples, the roof structure 22, and/or any other body panel 24, may be fabricated from a metallic material, such as a stamped sheet metal or aluminum, a polymeric material, an elastomeric material, a fibrous material, combinations thereof, and/or any other practicable material known in the art. The housing 28 may be formed from a polymeric material (including thermoplastic and thermosetting polymeric materials), an elastomeric material, a metallic material, combinations thereof, and/or any other material known in the art.

The light bar 30, as exemplarily illustrated in FIGS. 1 and 2, is mounted to the roof structure 22 of the vehicle 10 and is configured to provide additional illumination to an area surrounding the vehicle 10 and includes one or more light sources 36. The one or more light sources 36 may be selectively activated to illuminate a wide range of areas surrounding the vehicle 10. The light bar 30 may be used for any purpose, including, but not limited to, for providing additional illumination when operating the vehicle 10 in off-road situations and/or for providing illumination for emergency vehicles. In instances in which the light bar 30 is disposed on an emergency vehicle, the light bar 30 may be disposed in the first position when the light sources 36 are deactivated to conceal the light bar 30 from onlookers of the vehicle 10. It will be appreciated that the light bar 30 may additionally, and/or alternatively, include light sources 36 that are oriented in a vehicle side-to-side direction and/or rearwardly without departing from the scope of the present disclosure. It will be appreciated that the light assembly 20 may selectively illuminate various discrete locations proximate the vehicle 10 to provide illumination in various directions around the vehicle 10, such as illumination in a vehicle forward, vehicle rearward, and/or vehicle side-to-side direction.

Referring now to FIGS. 3 and 4, according to some examples, the light assembly 20 is disposed within the cavity 26 in the first position. In some examples, the cavity 26 is disposed below an external surface 38 of the roof structure 22 such that the light bar 30 may be concealed below the external surface 38 when disposed in the first position. In other examples, the cavity 26 may partially or fully extend above the external surface 38 of the roof structure 22. In some examples, the roof structure 22 further defines a rearward extension 40 that covers a rear portion of the cavity 26. The roof structure 22 may also define a forward extension 42 that partially covers a forward portion of the cavity 26.

A headliner 44 may be disposed on an opposing side of the roof structure from the light assembly 20. The headliner 44 may include first and second portions 46, 48. The first portion 46 may be disposed along the cavity 26 and the second portion 48 may be offset from the first portion 46. In some examples, the second portion 48 terminates proximate a windshield 50, or a forward panel, of the vehicle 10. The headliner 44 may include a backing panel 52 and a foam panel 54 attached to the backing panel 52. The backing panel 52 can be a polymeric panel, a fiberglass panel, or any other desired material. The backing panel 52 and foam panel 54 may have any desired thickness. According to various examples, the foam panel 54 maintains a substantially uniform thickness along the backing panel 52. Alternatively, the foam panel 54 may have a variable thickness based on the location of the foam panel 54 in relation to other features of the vehicle passenger compartment 12. It is contemplated that the backing panel 52 may be attached to the roof structure 22 through any means known in the art without departing from the teachings provided herein.

The bottom surface of foam panel 54 may be covered with a decorative cover 56, which can be a woven or non-woven fabric, textile, polymeric, and/or elastomeric material. A pattern may be disposed on the cover 56. The pattern may take any form such as a landscape graphic, a natural wood or stone image, a design, a shape or indicia. Further, the pattern may be provided with virtually any color or design and in any level of detail.

A roof structure seal 58 may be disposed between a forward portion of the roof structure 22 and the windshield 50. The roof structure seal 58 may be made of materials that are moldable by extrusion molding, injection molding, or the like. For example, thermoplastic elastomers, resin, rubber, such as an olefin-based thermoplastic elastomer (TPO), a styrene-based elastomer (TPS), polyvinyl chloride resin (PVC), polypropylene resin (PP), an ethylene propylene diene copolymer (EPDM), and/or any other practicable material may be used. It will be appreciated that the roof structure seal 58 may be formed from any other material and may be formed in any shape without departing from the scope of the present disclosure.

Referring still to FIGS. 3 and 4, the first support 60 may be operably coupled to an interior surface 62 of the rearward extension 40. The first support 60 may be removably and/or fixedly coupled to the inner surface through any fastening technique known in the art, including, but not limited to, welding, adhesives, and/or fasteners.

The first support 60 is operably coupled with an arm 64 on a first end portion 66 of the arm 64. The arm 64 is operably coupled with the housing 28 on a second end portion 68 thereof. In some examples, the arm 64 is pivotably coupled to the first support 60 and rotatable about a first axis 70. The arm 64, in some examples, includes a lower portion 72 proximate the first end portion 66 and an upper portion 74 that is proximate the second end portion 68. The lower portion 72 may be offset from the upper portion 74. However, in other examples, the lower and upper portions 72, 74 may be aligned without departing from the scope of the present disclosure. The offset orientation may allow a rear portion of the housing 28 to be disposed forwardly of the extension in when the housing 28 is in a first position, as illustrated in FIG. 3, and rearwardly of a portion of the extension when the housing 28 is disposed in the second position, as illustrated in FIG. 4. The arm 64 may further include an attachment portion 76 that is disposed along an interior surface 62 of the housing 28. The attachment portion 76 of the arm 64 may be operably coupled to the housing 28 through any fastening techniques known in the art, including, but not limited to, welding, adhesives, and/or fasteners.

A second support 78 may be operably coupled to a bottom surface 80 of the roof structure 22 that defines a base of the cavity 26. The second support 78 may be operably coupled to the roof structure 22 through any fastening techniques known in the art, including, but not limited to, welding, adhesives, and/or fasteners. An actuator 82 may be pivotably coupled to the second support 78 on a first end portion 84 thereof. A third support 88 may be operably coupled with an interior surface 90 of the housing 28. A second end portion 86 of the actuator 82 may be pivotably coupled to the third support 88.

The actuator 82 may be any type of actuator that may expand, contract, and/or otherwise move from a first position to a second position. For example, the actuator 82 may be configured as a mechanical actuator, a hydraulic actuator, a pneumatic actuator, a piezoelectric actuator, an electromechanical actuator, a linear motor, a telescoping linear actuator, and/or any other device known in the art. In other examples, in conjunction with the actuator 82 and/or in lieu of the actuator 82, the light assembly 20 may include any electronic device capable of circular motion for rotating the housing 28 between the first position and the second position without departing from the scope of the present disclosure.

With further reference to FIGS. 3 and 4, a bracket 92 is operably coupled and/or integrally formed with the housing 28. In some examples, the bracket 92 may include an upper member 94 and a lower member 96 that retain the light bar 30. In some examples, the bracket 92 may releasably retain the light bar 30. In other examples, the light bar 30 may be fixedly coupled and/or integrally formed with the bracket 92. The light bar 30 is operably coupled with the bracket 92 and includes one or more light sources 36. The one or more light sources 36 may be surrounded by a reflector 98 to assist in directing light emitted from the one or more light sources 36 in a predetermined direction. Moreover, the light sources 36 may be selectively activated to illuminate various locations proximate the vehicle 10 based on the light sources 36 that are activated by the controller 100.

Referring still to FIGS. 3 and 4, the light bar 30 and the actuator 82 are each electrically coupled with a controller 100 via wiring 102. In some examples, the wiring 102 is coupled to both the light bar 30 and the actuator 82 within the cavity 26. The wiring 102 may exit the cavity 26 through a grommet 104 that is disposed at a front portion of the cavity 26 and/or a within a boundary of the cavity 26. The wiring 102 may also be disposed below the light bar 30 when the light bar 30 is disposed within the first and second positions. The grommet 104 may be formed from a resilient material and defines an opening 106 therein. The grommet 104 may be configured to assist in preventing water or other environmental materials from entering the vehicle 10 through the grommet 104. The controller 100 can provide each light source 36 with generated pulse width modulated (PWM) signals to produce the corresponding light intensity and/or light color from the one or more light sources 36. Alternatively, the controller 100 can directly drive the current to the one or more light sources 36 to accomplish the same variations in intensity and/or light color. The controller 100 may further provide various activation and deactivation signals to the actuator 82 such that the actuator 82 may move in a desired direction.

Referring still to FIGS. 3 and 4, in various examples, a proximity switch 108 may be configured to activate/deactivate the one or more light sources 36 and/or control the positioning of the housing 28. The proximity switch 108 is mounted on the headliner 44 and generates a sense activation field 110 to sense contact or close proximity (e.g., within one millimeter) of an object, such as the hand (e.g., palm or finger(s)) of an operator. The proximity switch 108 may also detect a swiping motion by the hand of the operator such as a swipe of the thumb or another finger. It will be appreciated by those skilled in the art that additional or alternative types of proximity switches can be used, such as, but not limited to, capacitive sensors, inductive sensors, optical sensors, temperature sensors, resistive sensors, the like, or a combination thereof. It will be appreciated that the proximity switch 108 may additionally and/or alternatively include a mechanical switch of any type known in the art, such as a push button. In push button examples, a membrane may be provided as a seal over the switch. Depression of the membrane causes depression of a plunger on the switch. Internal switch contacts then change positions to provide an output signal.

With further reference to FIGS. 3 and 4, the housing 28 may include a peripheral seal 112 that is disposed on a periphery of the top surface 32. A forward portion 114 of the peripheral seal 112 may interact with the roof structure 22, and/or the forward extension 42 when the housing 28 is disposed in the first position. A rearward portion 116 of the peripheral seal 112 may interact with the rearward extension 40 in the first and/or second positions. Additionally and/or alternatively, a bracket seal 118 may be disposed on the lower member 96 of the bracket 92. The bracket seal 118 may interact with the roof structure 22 when the housing 28 is disposed in the second position. The peripheral seal 112 and the bracket seal 118 may each be made of materials that are moldable by extrusion molding, injection molding, or the like. For example, thermoplastic elastomers, resin, rubber, and specifically, an olefin-based thermoplastic elastomer (TPO), a styrene-based elastomer (TPS), polyvinyl chloride resin (PVC), polypropylene resin (PP), an ethylene propylene diene copolymer (EPDM), and/or any other practicable material may be used. It will be appreciated that the seal may be formed from any other material and may be formed in shape without departing from the scope of the present disclosure.

Figures 5, 6:
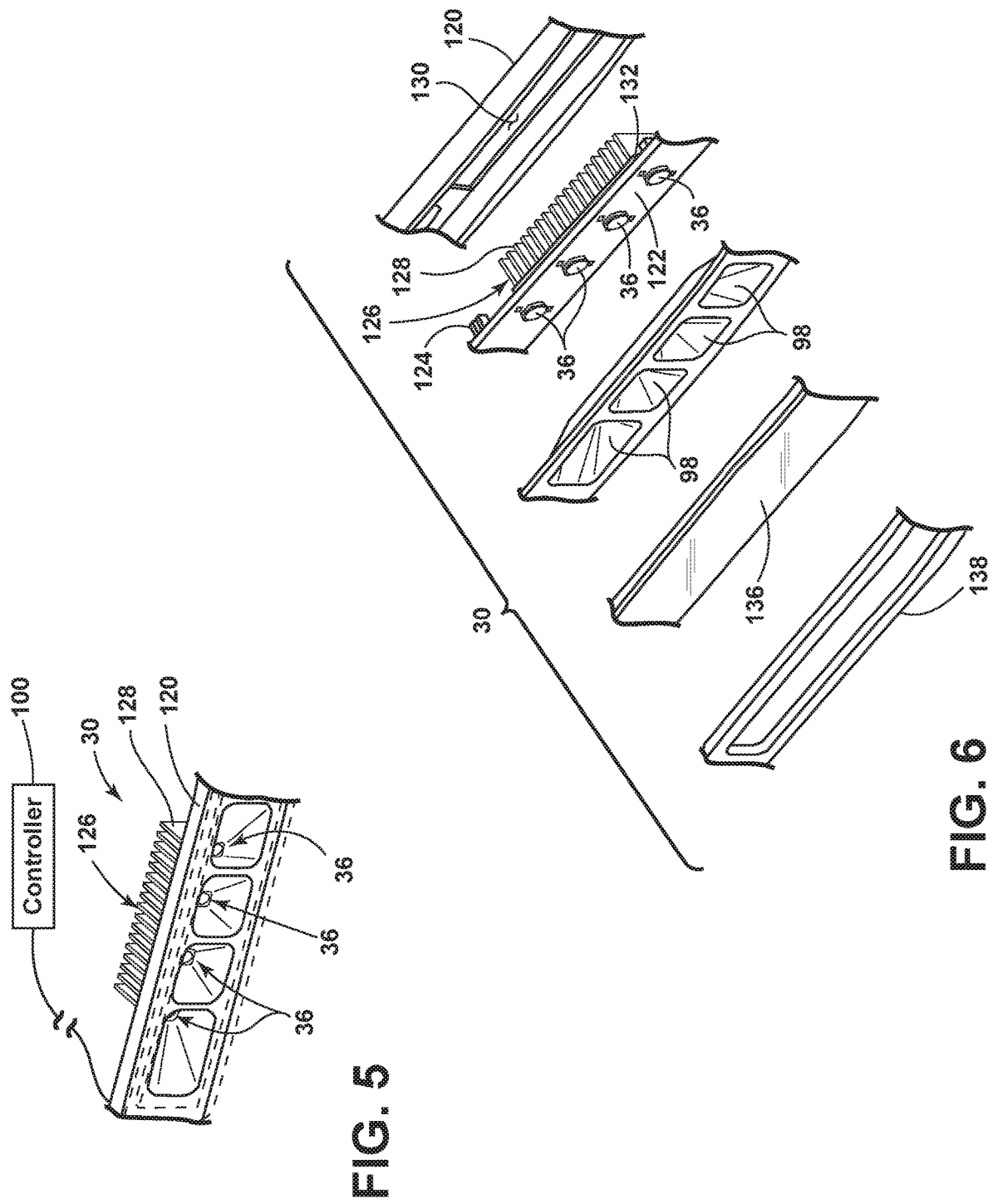
FIG. 5 is a front perspective view of a light bar within the light assembly, according to some examples.
FIG. 6 is a front, exploded view of the light bar of FIG. 5.

Referring to FIGS. 5 and 6, the light bar 30, according to some examples, includes a rear housing 120 for being fastened to the bracket 92 (FIG. 4). The rear housing 120 supports a circuit board, which may be configured as a printed circuit board (PCB) 122, oriented along the rear housing 120 and having control circuitry including drive circuitry for controlling activation and deactivation of the one or more light sources 36. The PCB 122 may be any type of circuit board including, but not limited to, any flexible PCB and/or rigid PCB. The controller 100 is configured to receive various inputs and control the one or more light sources 36 by applying signals to the light sources 36 within the light assembly 20. The controller 100 may be disposed within the light assembly 20 and/or within the vehicle 10.

A power terminal 124 is provided on the PCB 122 for passing through a seal for electrical connection with a corresponding receptacle within the vehicle 10. In some examples, the power terminal 124 may be surrounded by a connector shell that is molded in conjunction with any other portion of the light assembly 20, such as the rear housing 120.

With respect to the examples described herein, the light sources 36 may include any form of light sources. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the light assembly 20. Further, various types of LEDs are suitable for use as the light sources 36 including, but not limited to, top-emitting LEDs, side-emitting LEDs, and others. Moreover, according to various examples, multicolored light sources 36, such as Red, Green, and Blue (RGB) LEDs that employ red, green, and blue LED packaging may be used to generate various desired colors of light outputs from a single light source 36, according to known light color mixing techniques. In operation, the controller 100 may selectively control the light sources 36 such that one, all, or a portion of the light sources 36 can be activated at any given time.

Referring again to FIGS. 5 and 6, the light sources 36, while producing emitted light, also emit heat. As heat is emitted from the light sources 36, a heatsink 126 captures at least a portion of this heat. The captured heat is temporarily retained within elongated members 128 of the heatsink 126. The captured heat within the heatsink 126 migrates to areas that have a lower temperature than the heatsink 126. As such, the heatsink 126, after absorbing heat from the light sources 36, exchanges, or transfers heat to cooler regions in and around the light assembly 20. In some examples, the rear housing 120 may define a void 130 through which the heatsink 126 may extend. Accordingly, the heatsink 126 may dissipate heat into a space disposed between the light assembly 20 and a body panel 24 of the vehicle 10 to increase the efficiency of the heatsink 126.

In the various examples, the elongated members 128 of the heatsink 126 can extend generally perpendicular to a back portion 132 of the heatsink 126. In such an example, the elongated members 128 can be linear or can include various angled and/or curved portions. It is contemplated that, in various instances, the elongated members 128 can extend in an angled configuration or a curved configuration, or both, relative to the back portion 132 of the heatsink 126. It is further contemplated that each elongated member 128 can have configurations that can include, but are not limited to, linear, curved, angled, and trapezoidal, among other configurations. Additionally, various cross members can be included that extend across the elongated members 128 to add structure to the elongated members 128 and also add surface area through which heat can be transferred from the light assembly 20. It is also contemplated that the elongated members 128 may not have a consistent length. Such configurations may include a triangular profile, a trapezoidal profile, a curved profile, and an irregular profile, among other similarly shaped profiles. Various examples of the heatsink 126 may also include more than one row of elongated members 128, such as an inner layer and outer layer of elongated members 128.

In the various examples, the heatsink 126 can be made of various materials that have a high thermal conductivity. Such materials can include but are not limited to, aluminum, aluminum alloys, copper, composite materials that incorporate materials having a high thermal conductivity, combinations thereof, and other materials that are at least partially thermally conductive.

With further reference to FIGS. 5 and 6, the reflector 98 is provided within the light assembly 20. The reflector 98 may be formed integrally as depicted and each includes an aperture aligned with the corresponding light source 36. The reflectors 98 are utilized for reflecting and redirecting emitted light from the light sources 36 for focusing the illumination to one or more discrete locations. The reflectors 98 and corresponding light sources 36 are oriented to convey light forward, laterally outward, downward, and/or rearward of the housing 28 for illuminating the discrete locations.

A translucent lens cover 136 and a gasket 138 are also provided in the light assembly 20 for isolating various components of the light assembly 20 from external contaminants and weather. The lens cover 136 may include optics thereon. For example, the lens cover 136 may be configured with a Fresnel lens, a pillow optic, and/or any other type of lens or optic that is configured to disperse, concentrate, and/or otherwise direct light emitted from the light assembly 20 therethrough in any desired manner. The optics may assist in directing emitted light in a desired direction to form the various discrete locations.

Figure 7:
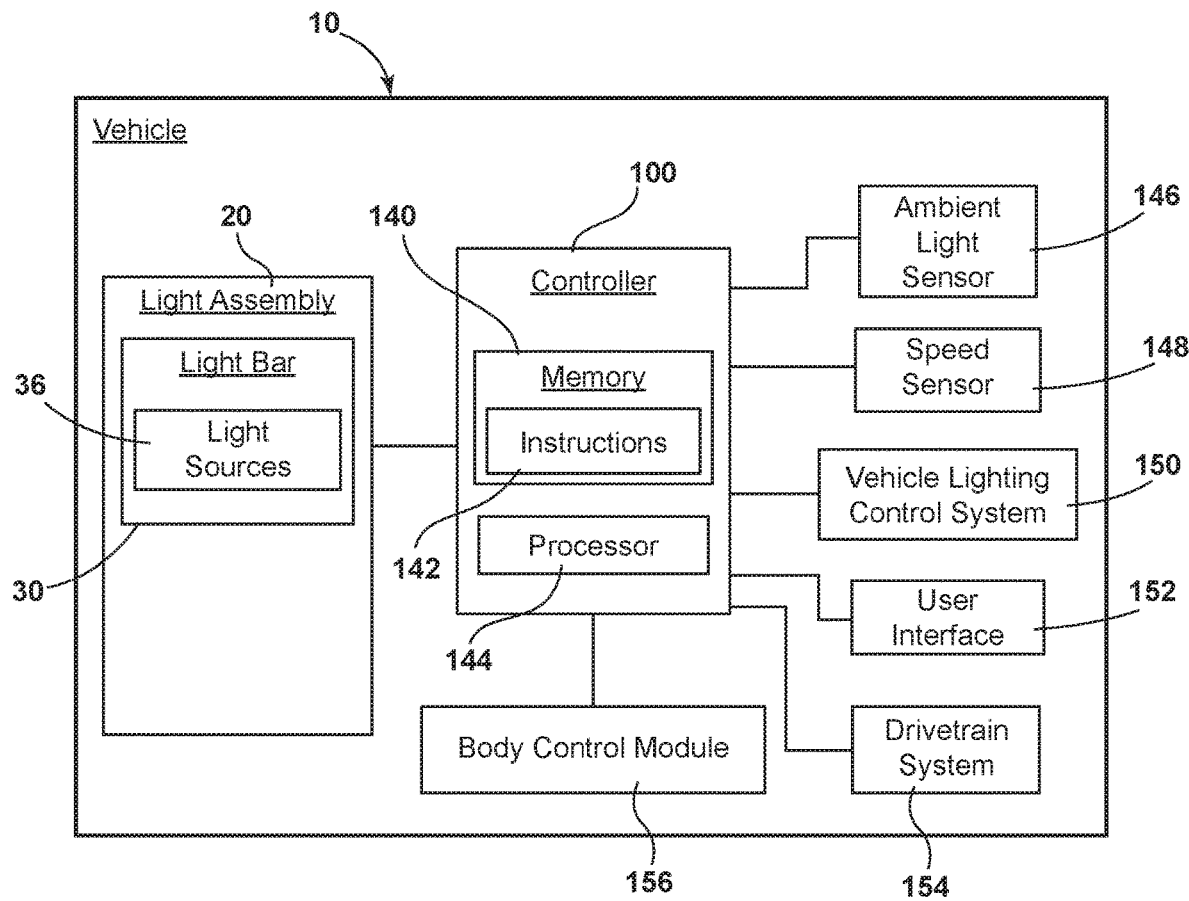
FIG. 7 is a block diagram of the vehicle and light assembly, according to some examples.

Referring to FIG. 7, the light sources 36 of the light assembly 20 are operably connected to the controller 100 and may correspond to a standalone controller or are otherwise integrated with an existing vehicle system. The controller 100 includes a memory 140 having instructions 142 stored thereon that are executable by a processor 144. The instructions 142 may generally relate to ways in which to operate the light sources 36 to affect the manner in which the light assembly 20 illuminates. The instructions 142 may also generally relate to ways in which to operate the actuator 82 for moving the housing 28 between the first position, the second position, and/or any intermediate position.

The controller 100 may also communicate with other vehicle devices such as, but not limited to, an ambient light sensor 146, a speed sensor 148, a vehicle lighting control system 150, a user interface 152, a drivetrain system 154, as well as a body control module 156 of the vehicle 10. By leveraging these vehicle devices, the light assembly 20 may provide a variety of functional and/or aesthetic lighting. For example, the light assembly 20 may illuminate as a supplemental daytime running lamp, a hazard light, or an emergency light, and/or an off-road light. The light assembly 20 may also be illuminated during a welcome or departure event when a user unlocks or locks the vehicle 10. While a few specific examples have been provided herein, it will be apparent to those of ordinary skill in the art that the light assembly 20 may be illuminated to provide other types of lighting without departing from the scope of the present disclosure.

In operation, the light sources 36 may be activated using a variety purposes based on a generated signal from the ambient light sensor 146, the speed sensor 148, the vehicle lighting control system 150, the user interface 152, or the drivetrain system 154. In some instances, the user interface 152 may be part of a Human Machine Interface (HMI) disposed within the vehicle 10, or the user interface 152 may work in conjunction with the HMI. The user interface 152 may be configured such that a user may selectively move the light assembly 20 between one or more positions, control any of the light sources 36, the wavelength of light that is emitted by the light sources 36, the illumination pattern emitted from the light assembly 20, an area proximate the vehicle 10 to be illuminated, etc. Additionally, or alternatively, the user interface 152 may be used to switch the light assembly 20 through a plurality of modes and/or functions. The user interface may also control the position of the housing 28. The user interface 152 may use any type of control known in the art for controlling the light source 36, such as, but not limited to, switches (e.g., proximity switches, push-type buttons) and may be disposed in any practicable location.

In some examples, the housing 28 may move from the first position to the second position when the vehicle 10 is disposed in predefined modes. For example, when the vehicle 10 is disposed in a low four-wheel-drive setting, the housing 28 may move from the first position to the second position. The light sources 36 may also be selectively activated based on detection of light proximate the vehicle 10. For example, the light bar 30 may become deactivated when the light is detected forwardly of the vehicle 10.

A variety of advantages may be derived from the use of the present disclosure. For example, use of the disclosed light assembly provides a unique aesthetic appearance to the vehicle. Moreover, the light assembly may provide lighting forwardly and/or outward of the vehicle. In some examples, the light assembly includes a housing that may conceal a light bar in a first position and allow the light bar to be at least partially outwardly of the roof structure, and/or any other body panel of the vehicle, in a second position. The light assembly may be manufactured at low costs when compared to standard vehicle lighting assemblies.

According to various examples, a vehicle light assembly is provided herein. The vehicle light assembly includes a housing operably coupled with a roof structure of a vehicle and movable between a first position and a second position. An arm is pivotably coupled to the roof structure on a first end portion and operably coupled with the housing on a second end portion. a bracket extends from the housing. The bracket is configured to retain a light bar. one or more light sources are disposed within the light bar. Examples of the vehicle light assembly can include any one or a combination of the following features:

the roof structure defines a cavity and a rearward extension extending forward from the roof structure;
a first support extends downwardly from the rearward extension, the arm pivotably coupled with the first support on the first end portion;
an actuator coupled to the housing on a first end portion and to an interior surface of the cavity on a second end portion;
the actuator is coupled to the housing in an intermediate position between the arm and the bracket;
a peripheral seal disposed around an upper portion of the housing;
a rear portion of the peripheral seal is configured to maintain contact with the roof structure in the first and second positions;
the light bar is concealed within the cavity in the first position and disposed vertically above a portion of the roof structure in the second position;
a bracket seal disposed on a lower member of the bracket, the bracket seal configured to interact with the roof structure when the housing is disposed in the second position;
the roof structure defines a forward extension and the peripheral seal is configured to contact the forward extension when the housing is in the first position and a bracket seal is configured to contact the forward extension in the second position;
a grommet disposed within a boundary of the cavity, the grommet defining an opening through which one or more wires operably couple the light bar to a controller; and/or
a user interface configured to activate at least one of the one or more light sources and the actuator.

Moreover, a method of manufacturing a vehicle light assembly is provided herein. The method operably coupling a housing with a roof structure of a vehicle. The housing is movable between a first position and a second position. The method also includes pivotably coupling an arm to the roof structure on a first end portion. The method further includes coupling the arm with the housing on a second end portion. Further, the method includes positioning a bracket on the housing, the bracket configured to retain a light bar. Lastly, the method includes disposing one or more light sources within the light bar.

According to some examples, a vehicle light assembly is provided herein. The vehicle light assembly includes a housing concealable within a body structure of a vehicle and movable between a first position and second position. A bracket configured to retain a light bar. One or more light sources disposed within the light bar. A peripheral seal disposed around an upper portion of the housing. A bracket seal disposed on a bottom portion of the bracket. Examples of the vehicle light assembly can include any one or a combination of the following features:

the body structure defines a cavity and a rearward extension extending vehicle forward of the body structure;
a first support extends downwardly from the rearward extension and an arm is pivotably coupled with the first support on a first end portion and the housing on a second end portion; and/or
an actuator coupled to the housing on a first end portion and to an interior surface of a cavity defined by the body structure on a second end portion.

According to other examples, a vehicle light assembly is provided herein. The vehicle light assembly includes a housing concealable within a cavity defined by a body structure of a vehicle and movable between a first position and a second position. A bracket extends from the housing and is configured to retain a light bar. One or more light sources are disposed within the light bar. An actuator is coupled to the housing on a first end portion and to an interior surface of the cavity on a second end portion. Examples of the vehicle light assembly can include any one or a combination of the following features:

the one or more light sources are operably coupled with a lens for directing light emitted from the one or more light sources in a predefined direction;

the actuator is configured as a linear actuator; and/or a peripheral seal disposed around an upper portion of the housing, and a bracket seal disposed on a bottom portion of the bracket.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Implementations of the systems, apparatuses, devices, and methods disclosed herein may include or utilize a special-purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, implementations of the present disclosure can include at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general-purpose or special-purpose computer. Combinations of the above should also be included within the scope of computer-readable media.

Computer-executable instructions include, for example, instructions and data, which, when executed at a processor, cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through the network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor examples discussed above might include computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration, and are not intended to be limiting. Examples of the present disclosure may be implemented in further types of devices, as would be known to persons skilled in the relevant art(s).

At least some examples of the present disclosure have been directed to computer program products including such logic (e.g., in the form of software) stored on any computer usable medium. Such software, when executed in one or more data processing devices, causes a device to operate as described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle light assembly comprising:
   a housing operably coupled with a roof structure of a vehicle and movable between a first position and a second position;
   an arm including a first end portion and a second end portion, the first end portion pivotably coupled to a first support and the second end portion directly and fixedly coupled in a stationary connection to an interior surface of the housing at a rear edge of the housing, wherein the first end portion extends upward from the roof structure;
   a bracket extending downwardly from the housing, the bracket configured to retain a light bar; and
   one or more light sources disposed within the light bar.

2. The vehicle light assembly of claim 1, wherein the roof structure defines a cavity and a rearward extension extending forward from the roof structure, wherein the rearward extension is substantially aligned with the housing when the housing is in the first position.

3. The vehicle light assembly of claim 2, wherein the first support extends downwardly from the rearward extension, the arm pivotable about a first axis of the first support.

4. The vehicle light assembly of claim 3, further comprising:
   an actuator coupled to the housing on a first end portion and to an interior surface of the cavity on a second end portion.

5. The vehicle light assembly of claim 4, wherein the actuator is coupled to the housing in an intermediate position between the arm and the bracket.

6. The vehicle light assembly of claim 4, further comprising:
   a user interface configured to activate at least one of the one or more light sources and the actuator.

7. The vehicle light assembly of claim 2, wherein the light bar is concealed within the cavity in the first position and disposed vertically above a portion of the roof structure in the second position.

8. The vehicle light assembly of claim 2, further comprising:
   a grommet disposed within a boundary of the cavity, the grommet defining an opening through which one or more wires operably couple the light bar to a controller.

9. The vehicle light assembly of claim 1, further comprising:
   a peripheral seal disposed around an upper portion of the housing.

10. The vehicle light assembly of claim 9, wherein a rear portion of the peripheral seal is configured to maintain contact with the roof structure in the first and second positions.

11. The vehicle light assembly of claim 9, wherein the roof structure defines a forward extension and the peripheral seal is configured to contact the forward extension when the housing is in the first position and a bracket seal is configured to contact the forward extension in the second position.

12. The vehicle light assembly of claim 1, further comprising:
   a bracket seal disposed on a lower member of the bracket, the bracket seal configured to interact with the roof structure when the housing is disposed in the second position.

13. A vehicle light assembly comprising:
   a housing concealable within a body structure of a vehicle and movable between a first position and a second position;
   a bracket extending downwardly from the housing, the bracket configured to retain a light bar;
   a support extending downwardly from, and directly and fixedly coupled in a stationary connection to, an interior surface of the body structure and defining a pivot axis;
   an arm pivotable about the pivot axis and including first and second end portions, the first end portion pivotably coupled with the support;

one or more light sources disposed within the light bar;

a peripheral seal disposed around and coupled with an upper portion of the housing; and a bracket seal disposed on a bottom portion of the bracket.

14. The vehicle light assembly of claim 13, wherein the body structure defines a cavity and a rearward extension extending vehicle forward of the body structure.

15. The vehicle light assembly of claim 14, wherein the second end portion of the arm is coupled with an interior surface of the housing.

16. The vehicle light assembly of claim 13, further comprising:

an actuator coupled to the housing on a first end portion and to an interior surface of a cavity defined by the body structure on a second end portion.

17. A vehicle light assembly comprising:

a housing concealable within a cavity defined by a body structure of a vehicle and movable between a first position and a second position;

a bracket extending downwardly from, and directly and fixedly coupled in a stationary connection to, an interior surface of the housing, the bracket positioned at a front edge of the housing and configured to retain a light bar;

one or more light sources disposed within the light bar; and an actuator including a first end portion and a second end portion, wherein the first end portion is pivotably coupled to a first support and the second end portion is pivotably coupled to a second support, the first support extending upwardly from a bottom surface of the cavity and the second support extending downwardly from the interior surface of the housing.

18. The vehicle light assembly of claim 17, wherein the one or more light sources are operably coupled with a lens for directing light emitted from the one or more light sources in a predefined direction.

19. The vehicle light assembly of claim 17, wherein the actuator is configured as a linear actuator.

20. The vehicle light assembly of claim 17, further comprising:

a peripheral seal disposed around an upper portion of the housing; and a bracket seal disposed on a bottom portion of the bracket.

* * * * *